United States Patent
Forcier et al.

(10) Patent No.: US 7,498,946 B2
(45) Date of Patent: *Mar. 3, 2009

(54) ULTRASONIC TRANSMITTER AND RECEIVER SYSTEMS AND PRODUCTS USING THE SAME

(75) Inventors: Robert Forcier, Mesa, AZ (US); Paul Brantner, Conifer, CO (US)

(73) Assignee: BeezerBug Incorporated, Mesa, AZ (US)

(*) Notice: Subject to any disclaimer, the term of this patent is extended or adjusted under 35 U.S.C. 154(b) by 207 days.

This patent is subject to a terminal disclaimer.

(21) Appl. No.: 11/365,835

(22) Filed: Mar. 2, 2006

(65) Prior Publication Data

US 2006/0181421 A1    Aug. 17, 2006

Related U.S. Application Data

(62) Division of application No. 10/237,175, filed on Sep. 9, 2002, now Pat. No. 7,061,381.

(60) Provisional application No. 60/369,881, filed on Apr. 5, 2002.

(51) Int. Cl.
    *G08B 13/14* (2006.01)
(52) U.S. Cl. ............... 340/572.2; 340/572.1; 340/568.1
(58) Field of Classification Search ............ 340/572.1, 340/572.2, 572.4, 571, 568.1, 568.5, 568.6, 340/573.1, 573.3, 573.4, 573.7, 10.2; 600/440, 600/442

See application file for complete search history.

(56) References Cited

U.S. PATENT DOCUMENTS

| | | | | |
|---|---|---|---|---|
| 3,666,094 A | 5/1972 | Martin | | 209/590 |
| 3,696,384 A | 10/1972 | Lester | | 340/312 |
| 3,925,763 A | 12/1975 | Wadhwani et al. | | 340/825.36 |
| 4,225,953 A | 9/1980 | Simon et al. | | 367/117 |
| 4,787,393 A | * | 11/1988 | Fukukita et al. | 600/440 |
| 4,856,334 A | 8/1989 | Shearer et al. | | 73/588 |
| 4,868,445 A | 9/1989 | Wand | | 310/316 |
| 5,150,714 A | * | 9/1992 | Green | 600/442 |
| 5,300,875 A | * | 4/1994 | Tuttle | 320/138 |
| 5,317,533 A | 5/1994 | Quate et al. | | 250/306 |
| RE36,791 E | 7/2000 | Heller | | 342/450 |
| 6,140,740 A | 10/2000 | Porat et al. | | 310/322 |
| 6,142,946 A | 11/2000 | Hwang et al. | | 600/459 |
| 6,211,799 B1 | 4/2001 | Post et al. | | 341/33 |
| 6,220,098 B1 | 4/2001 | Johnson et al. | | 73/592 |
| 6,237,398 B1 | 5/2001 | Porat et al. | | 73/54.9 |
| 6,246,898 B1 | 6/2001 | Vesely et al. | | 600/424 |
| 6,281,797 B1 | 8/2001 | Forster et al. | | 340/572.3 |

(Continued)

*Primary Examiner*—Van T. Trieu
(74) *Attorney, Agent, or Firm*—Greenberg Traurig, LLP

(57) ABSTRACT

A transceiver preferably embedded within a wearable security watch, PDA, or other device which achieves a variety of wireless ultrasonic and/or radio-frequency based functions, including digital identification and proximity and sensation monitoring of assets, individuals, pets, and the like. The portable or wearable device realizes these functions by periodically polling and receiving information tags within the transmitting distance of the device. The invention can help reduce the likelihood of the theft, loss, or misplacement by detecting that a tag associated with or attached to an entity has left an individual's proximity and sounding an alarm. The device can also assist individuals with sensory impairments, including persons who are deaf, diabetic, and the like, by detecting a tagged entity as it enters the space around an individual, or by detecting environmental stimuli, such as excessive heat in an individual's proximity or vital sign changes, and sounding an alarm.

16 Claims, 15 Drawing Sheets

U.S. PATENT DOCUMENTS

| | | | |
|---|---|---|---|
| 6,329,918 B1 | 12/2001 | Moyer | 340/573.1 |
| 6,362,778 B2 | 3/2002 | Neher | 342/357.07 |
| 6,432,050 B1 | 8/2002 | Porat et al. | 600/300 |
| 6,433,689 B1 | 8/2002 | Hovind et al. | 340/573.1 |
| 6,473,704 B1 | 10/2002 | Ito et al. | 702/94 |
| 6,542,083 B1 | 4/2003 | Richley et al. | 340/572.1 |
| 6,569,102 B2 | 5/2003 | Imran et al. | 600/459 |
| 6,770,032 B2 | 8/2004 | Kaplan | 600/437 |

* cited by examiner

ULTRASONIC TRANSMITTER AND RECEIVER SYSTEMS AND PRODUCTS USING THE SAME

PRIORITY CLAIM

This application is a divisional application of U.S. patent application Ser. No. 10/237,175 filed on Sep. 9, 2002, now U.S. Pat. No. 7,061,381, which is hereby incorporated by reference in its entirety, which is related to, and claims priority from, U.S. Provisional Patent Application Ser. No. 60/369,881, filed Apr. 5, 2002 entitled "Portable or Wearable Proximity Security Device", the teachings of which are incorporated herein in their entirety.

FIELD OF THE INVENTION

The present invention relates to the field of wireless communications. In particular, the present invention provides wireless proximity monitoring, identification verification, and proximity sensation monitoring in a portable or wearable device.

BACKGROUND OF THE INVENTION

Several industries use Radio Frequency Identification (RFID) systems for applications such as inventory control, asset verification, and vehicle movement tracking. RFID systems typically consist of two components, readers and tags. A reader is typically a wall-mounted or counter mounted device which broadcasts an interrogation signal to a tag and which can interpret the information from the tag for some use. Tags are typically small, plastic encased devices which are placed on or in an article carried by an individual and are used by several industries for applications such as inventory control, asset verification, and vehicle movement tracking. The tags typically contain information regarding the type of article or a unique identification number that is meaningful to the system. The information is obtained from the tag by interrogating the tag utilizing electromagnetic waves, such as magnetic, magneto mechanical, radio frequency (RF), microwave, and the like.

Most RFID systems use interrogation and response frequencies near or above 1 MHz, with the most commonly used frequencies being 126 KHz, 915 KHz, 13.56 MHz, and 2.45 GHz. At these frequencies, tags are susceptible to shielding, especially shielding by the human body such as a hand, which can be disruptive to their functioning.

Lower tag frequencies are moderately resistant to shielding by the human body and other objects, but have only limited radio frequency functionality due to bandwidth and distance limitations. In addition, the lower frequency tags are rather bulky. Bandwidth tends to increase and tags tend to be smaller as the operating frequency increases. In addition, interrogation distance is greatest at approximately 915 MHz and starts to go down again after 915 MHz. Unfortunately, these higher frequencies are more susceptible to shielding, especially by the human body.

There are two basic categories of tags: passive and active. Passive tags operate and respond to interrogation signals by absorbing the interrogation signal energy, and using this energy to wake up a semiconductor identification chip within the tag. The energy is also used to send back an electromagnetic signal that is often as little as $1/1000$ the strength of the original signal. Active tags have a battery that is part of the tag that allows the return signal power to be amplified, thereby transmitting across greater distances.

RFID tags are typically interrogated by readers which have transmit and receive electronics that operate in the 0.1 to 0.5 milliwatt region. Tag interrogation typically occurs at distances ranging from 1 inch to 12 feet for passive tags. Active tags have much greater transmit distances, and can frequently transmit from 3 feet to 1000 feet or more and usually are much larger in size.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Phillips Semiconductors, Single Chips Systems (see U.S. Pat. Nos. 4,442,507; 4,796,074; 5,095,362; 5,296,722; and 5,407,851), CSIR (see European document numbers 0 494 114 A2; 0 585 132 A1; 0 598 624 A1; and 0 615 285 A2), IBM (see U.S. Pat. Nos. 5,528,222; 5,550,547; 5,521,601; and 5,682,143), and Sensormatic Electronics (see U.S. Pat. No. 5,625,341). The teachings of the above-referenced patents are included herein in their entirety.

Current reader and transmitter units are typically bulky and are not well suited for incorporation into a small low power device such as a wrist watch. Also, the typical 0.1 mw to 0.5 mw reader power requirements are not well suited for incorporation into a wrist watch, portable digital assistant (PDA), or other portable or wearable device.

In addition to practical problems faced by present RFID systems, including weak transmission signal power, greater size and weight associated with some tags and transducers, and signal shielding, other, more abstract problems also exist. One such problem is the fact that each country can control transmissions on various segments of the frequency spectrum within that country. Although there is some uniformity from country-to-country, it is not uncommon for different countries to have prohibited transmissions on frequencies typically used by present RFID systems. Thus, it is desirable to find a transceiver that will function at a frequency that will allow the transceiver, and the associated RFID system, to be used in a variety of countries.

SUMMARY OF THE INVENTION

Accordingly, the present invention is directed to a portable or wearable proximity security device that substantially obviates one or more of the problems due to limitations and disadvantages of the related art.

An object of the present invention is to develop a means by which devices can communicate wirelessly which is less prone to human body shielding while still allowing the devices to be a reasonable distance from each other when such communication is performed.

Another object of the present invention is the creation of a "security tent" within a fixed distance from an individual.

A further object of the present invention is the creation of an identification device which can be used in many countries around the world.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The embodiments of the present invention described herein make use of RFID or ultrasonic tags and a corresponding reader/transmitter (transceiver) within a wrist watch, PDA, or other portable or wearable device to facilitate proximity monitoring, identification verification, proximity sensation, and other functions, at or within a set distance from an individual. Successful digital communication has been demonstrated with Polyvinylidene fluoride (PVDF) film transducers and a transceiver utilizing ultrasonic communication at a frequency of approximately 40 KHz. During testing associated with the present invention, an individual was placed between the transmitting and receiving antennas, and the ability to communicate in both directions was possible within at least 2.5 feet from the individual, thereby validating this communication approach to proximity monitoring. Mechanical coupling was also achieved during testing with an individual on the transmit side, thereby activating the human body as an extended antenna to improve the range between the transmitter and the tag. The distance for reading the tag improved to substantially beyond 3 feet, even with transmission power as low as −76 dB.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

A preferred embodiment of the present invention utilizes a transceiver embedded within a wearable security watch, PDA, or other wearable or portable device to achieve a variety of wireless ultrasonic and/or radio-frequency based functions, including, but not limited to, digital identification, and proximity and sensation monitoring. Monitored items may include, but are not limited to, assets, individuals, pets, and/or environmental factors. The portable or wearable device (generally "device") realizes these functions by periodically polling and receiving information, including identification information, from some or all tags within the transmitting distance of the device.

The device can help reduce the likelihood of the theft, loss, or misplacing of an asset, person, pet, or other item. If the device detects that a tag associated with or attached to an entity has left an individual's proximity, the device may sound an alarm, thereby notifying the individual that the item may have been lost, stolen, forgotten, or otherwise misplaced. By way of example, without intending to limit the present invention, an individual wearing a watch outfitted with a transceiver and whose wallet has an appropriate tag may be notified if his or her wallet is pick-pocketed by a thief because the watch will no longer receive identification information from the tag associated with the wallet. It should be appreciated by one skilled in the art that although reference is made to the "sounding" of an alarm, an alarm generated by the present invention can be comprised of one or more of a variety of sensory inputs including, but not limited to, audible alarms, flashing lights, tactile feedback such as vibrations, and the emission of unusual odors.

The device can also help assist individuals with sensory impairments, including persons who are deaf or blind, by detecting a tagged item as it enters the space around the individual and sounding an alarm, thereby notifying the individual that the tagged item is within the individual's proximity. In a similar manner, the device can be programmed for environmental monitoring for individuals, including paraplegics, diabetics, asthmatics, and the like, who are unable to adequately determine tactile sensations or other environmental factors in their immediate proximity. The present invention can be configured to monitor for certain environmental stimuli, such as excessive heat or air pollution, and to sound an alarm when the stimuli exceeds certain preset limits. This can be especially useful with respect to car heaters, irons, coffee pots, and the like, which can pose a significant health threats if an individual cannot sense burning.

Figure 1:
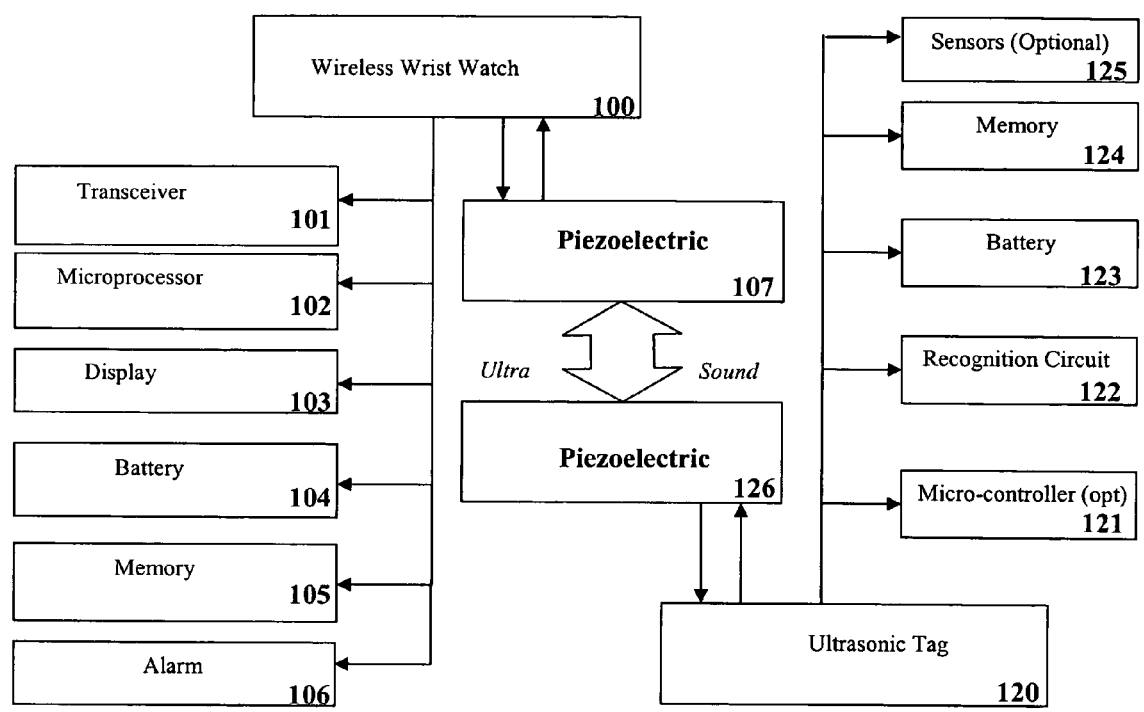
FIG. 1 is a block diagram of the functional elements within a watch embodiment of the present invention.

FIG. 1 illustrates a block diagram of electronic functions and components of preferred watch 100 and tag 120 embodiments and how each component contributes to the system. Micro-controller 102, which is preferably supported by at least 8 kB of flash memory 105, controls overall watch operations, including both traditional watch functions and the more specialized functions associated with the present invention. A user can preferably control watch functions by viewing and interacting with display 103 and/or commanding micro-controller 102 to perform various functions by pushing activation buttons on watch 100 (not illustrated). These functions may be made reprogrammable by storing them in memory 105. Watch 100 may receive power from battery power source 104, which is preferably rechargeable. Alarm 106 is preferably a ceramic piezo which provides audible warnings, but may also include a light emitting diode (LED) for providing visual reference to an alarm, a motor driving an offset weight to provide vibratory reference of an alarm, and other such alarm mechanisms. Display 103, which is preferably a liquid crystal display (LCD), can provide visual references, such as the current time and alarm status.

In addition to traditional watch functions, micro-controller 102 also employs data transceiver 101 and transducer(s) 107 to communicate with one or more tags 120. Micro-controller 102 can use transceiver 101 to transmit data to and from tag 120 via transducer(s) 107. Thin film piezoelectric ultrasound transducer(s) 107, which is preferably comprised of at least two PVDF films, transmit and receive data at ultrasonic frequencies, although it should be appreciated by one skilled in the art that alternative materials and frequencies can be used without departing from the spirit or the scope of the invention.

Tag 120 also comprises several components. In the embodiment illustrated in FIG. 1, tag 120 is an active tag, receiving power from battery power source 123, which is preferably rechargeable. Thin film piezoelectric ultrasound transducer(s) 126, preferably comprised of at least two PVDF films, transmit and receive ultrasound data. Code recognition circuit 122 is capable of a variety of functions, including determining whether a discrete tag is being polled by watch 100, or whether all tags within the transmission distance of watch 100 are being polled. Memory 124, preferably capable of storing a minimum of 4 bytes of data, can store identification information associated with tag 120. Optional sensors 125 can be used for environmental detection or biosensing, as described in more detail below. Controller 121, which is optional, allows ultrasound and sensor data conditioning, and also permits expanded tag functions. Such expanded tag functions may include, but are not limited to, storing additional or alternative information in memory 124.

In an alternative embodiment, tag 120 may be a passive tag. In such an embodiment, battery 123 may not be necessary, as the tag can derive its operational power from the energy received as part of the transmission from watch 100. In still another embodiment, code recognition circuit 122 may not be included in tag 120, thereby causing tag 120 to respond to all polling by watch 100.

When tag 120 is polled by watch 100, tag 120 may transmit information stored in memory 124, information from sensors 125, or other such information. Tag 120 may also receive information from watch 100 as part of the polling process, or in a function separate therefrom. By way of example, without intending to limit the present invention, watch 100 may periodically transmit a random security code to tag 120. Such a random security code can be used to verify the identity of tag 120 by tag 120 transmitting such information when tag 120 is subsequently polled by watch 100. This can reduce the likelihood that someone could introduce a new tag with the same identification information as a previously existing tag, and thereby steal or misappropriate the item to which the previously existing tag is attached.

Figure 2:
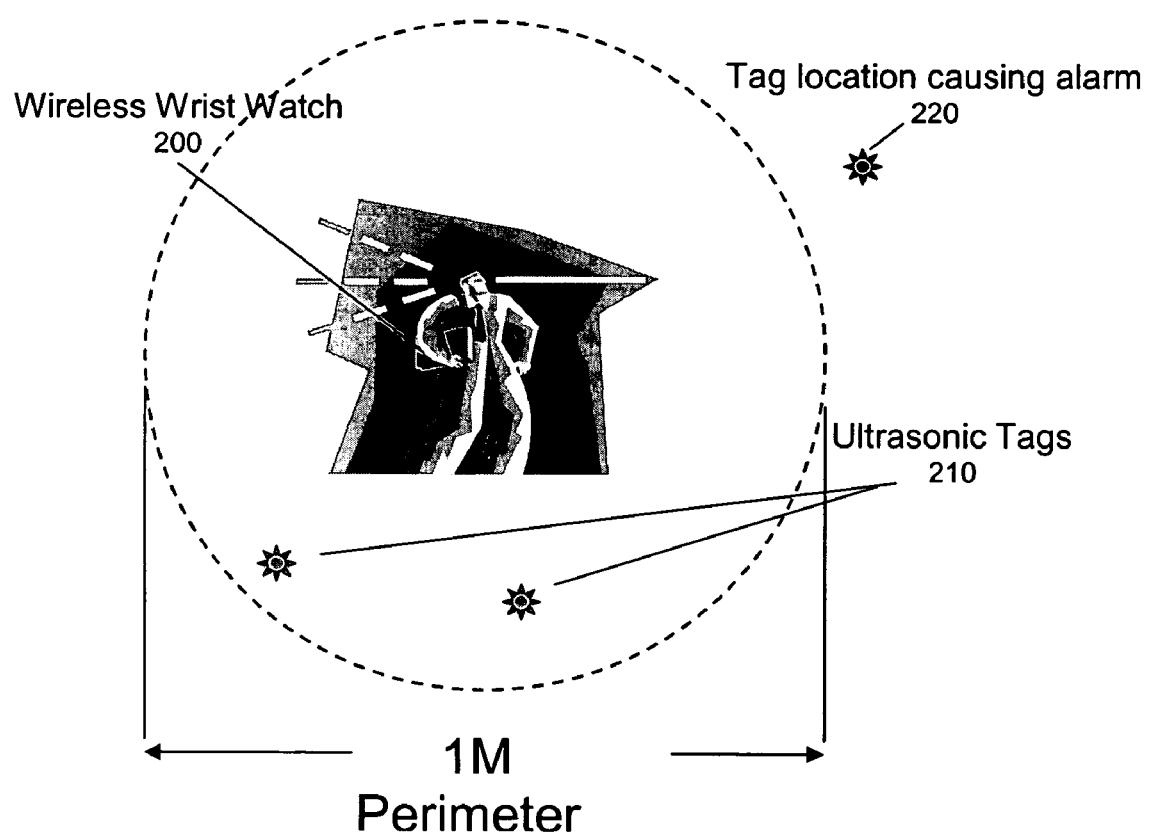
FIG. 2 is a diagram of the 1 meter proximity detection field surrounding an individual possessing the present invention.

FIG. 2 illustrates the implementation of a 1 meter perimeter for the detection of tags around an individual. Such a perimeter can be achieved by adjusting the transmission power from the transceiver embedded within portable or wearable device. In the embodiment illustrated in FIG. 2, a transceiver within wrist watch 200 has been calibrated such that transmissions from wrist watch 200 do not extend beyond approximately one meter. When ultrasonic tags 210 are within wrist watch 200's transmission range, they can reply to query signals from wrist watch 200 and wrist watch 200 does not sound an alarm. When an ultrasonic tag, such as tag 220, is outside the transmission range, the tag cannot respond to a query signal from wrist watch 200, and wrist watch 200 may sound an alarm.

The perimeter system of FIG. 2 can also be used in other embodiments. By way of example, without intending to limit the present invention, wrist watch 200 may sound an alarm when tag 220 enters the perimeter. In another example, tag 220 may contain a temperature or other environmental sensor, perhaps attached to an iron. As wrist watch 200 approaches tag 220 and causes tag 220 to fall within wrist watch 200's transmission range, as would happen when a person wearing wrist watch 200 walks near an iron to which tag 220 is attached, wrist watch 200 may poll tag 220 to determine the temperature at tag 220. Alternatively, tag 220 may transmit a signal to wrist watch 200 without being polled if the temperature or other environmental factor measured by tag 220 exceeds a preset limit. Such a present limit may be inherent in tag 220, or may be set using wrist watch 200 or an alternative device, such as a computer.

Figure 3:
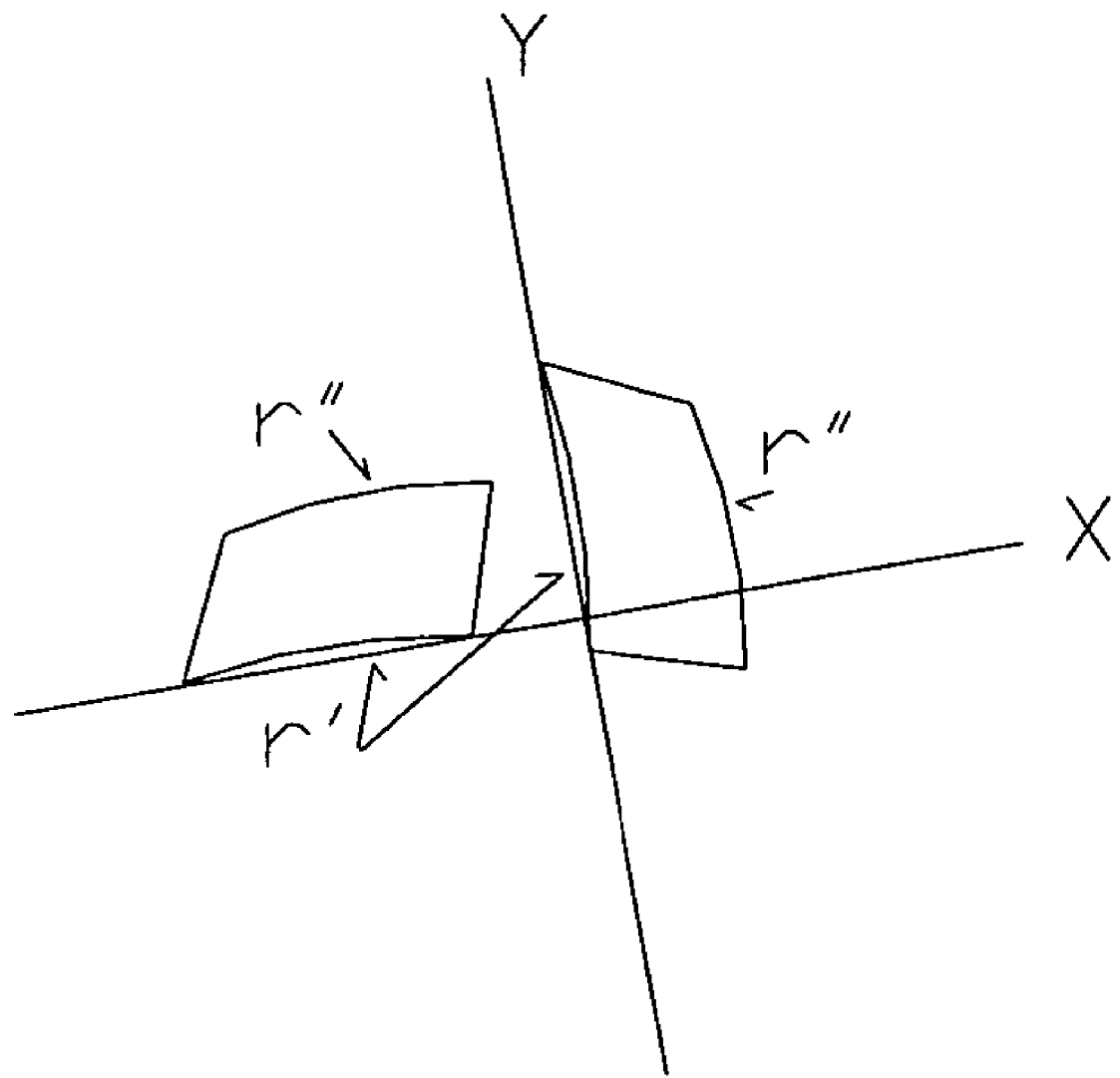
FIG. 3 is a general layout depicting a tag transducer design.

FIG. 3 illustrates a preferred tag transducer configuration. Such a transducer arrangement can be used as part of piezoelectric ultrasound transducer(s) 126 of FIG. 1. The embodiment illustrated in FIG. 3 uses multiple transducers, with each transducer having a very thin profile. The transducers should also be effective within a minimum desirable perimeter with obstacles between a tag and the device into which the transducer is embedded. Each transducer should be oriented along a separate axis (preferably the x and y axes). Pre-stress of the film along the longitudinal axis (x or y) is preferred, and a bend radius is incorporated to accomplish this. Note that there are two radii shown for each film: changing the radii allows for a distinct z-axis separation between the films and assists in omni-directional response. Frequency response is the critical determining factor for radius. Presently, a transducer with a nominal radius of 37.5 mm, approximately 18.75 mm arc length, and width of approximately 9.375 mm, is preferred to achieve optimal frequency response at 60 KHz. It should be apparent to one skilled in the art that alternative transducer sizes, shapes, bend radii, and frequency responses can be substituted without departing from the spirit or the scope of the present invention. By way of example, without intending to limit the present invention, if the tag is in a high vibration or high sonic noise environment, the frequency can be adjusted to suit and multi frequency operation can be performed if required.

Figure 4:
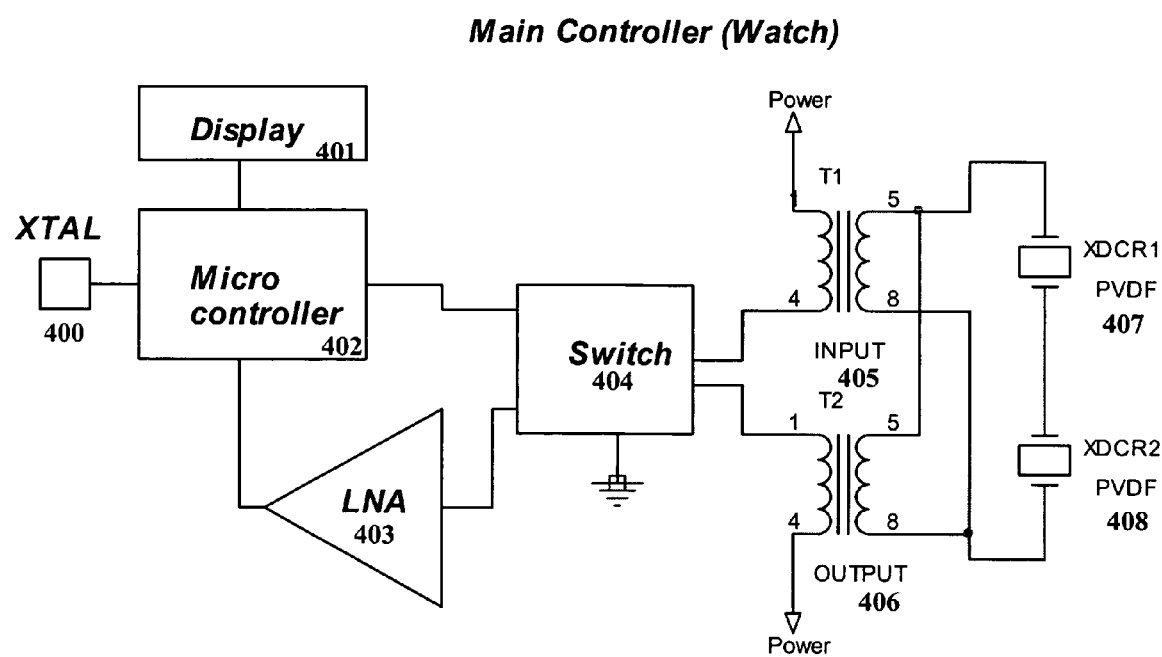
FIG. 4 is a block diagram schematic of a watch embodiment of the present invention with piezoelectric transducer(s).

FIG. 4 illustrates a preferred main controller block schematic for a watch-based embodiment of the present invention. Individual support components are not shown here, but should be apparent to one skilled in the art. In addition, it should be apparent to one skilled in the art that an alternative schematic design may be substituted for the preferred schematic illustrated in FIG. 4, and that the schematic illustrated in FIG. 4 may be used in alternative embodiments of the present invention. A preferred main controller consists of a variety of components. Micro-controller 402 is typically powered up at all times. Discrete crystal 400 allows for accurate timekeeping A main controller should also include a means of accessing and providing information to the individual operating the controller. In a preferred embodiment, a main controller includes LCD display 401. LCD display 401 may be a standard, multi-segment LCD display as used in current watches, or LCD display 401 may include a pixel-based display, thereby allowing the watch to display a wide variety of information, including static and moving images, alphanumeric characters, and the like. Alternatively, LCD display 401 may include speech recognition and speech generating capabilities, and methods of generating tactile or other sensory stimuli, thereby allowing a user who is deaf, visually impaired, or otherwise disabled to operate and interact with the main controller.

A main controller can also include a switch 404 for controlling whether data is received by or transmitted from micro-controller 402. In addition, a main controller may include power/signal transformers 405 and 406 for data level conditioning. Piezo electric transducers 407 and 408 perform actual data transmissions to tags and receive data from tags. A main controller should also include a low noise amplifier (LNA) 403 to amplify tag return data.

Figure 5:
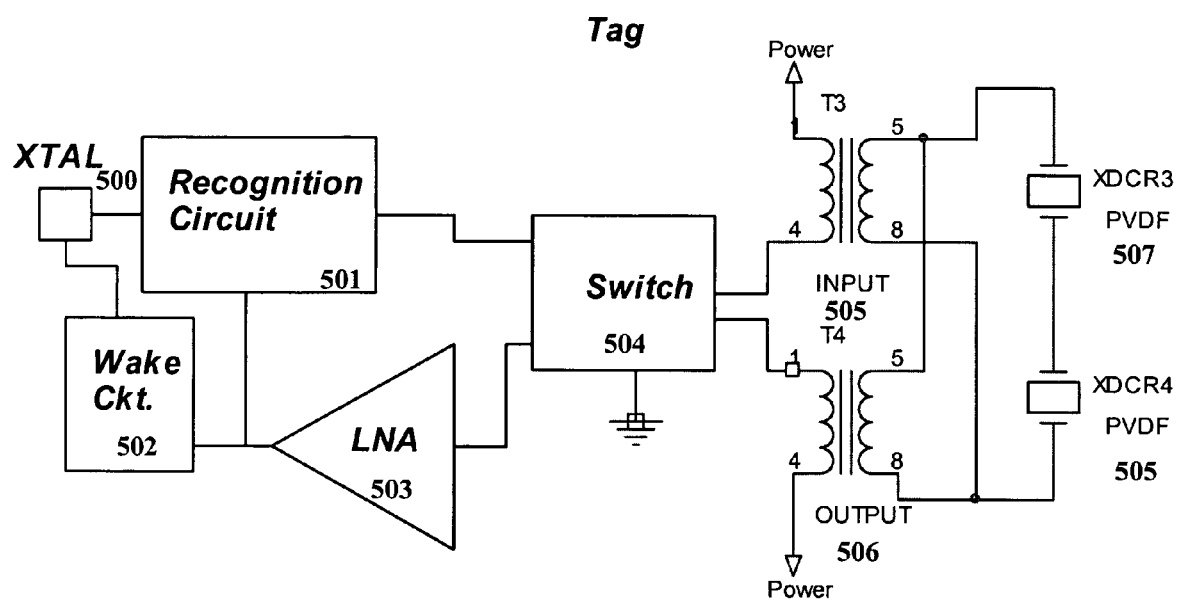
FIG. 5 is a block diagram schematic of an ultrasonic tag with piezoelectric transducer(s).

FIG. 5 illustrates a preferred tag block schematic. In this embodiment, a tag should consist of several components. Passive wake up circuit 502 powers up the tag if the tag is interrogated. Recognition circuit 501, which remains powered down unless the tag is interrogated, is responsible for determining whether the interrogation signal received by the tag is intended for the tag, and what the appropriate response should be, if one is necessary. Crystal 500 allows for receive/transmit signal matching. Switch 504 determines whether data is received from a tag's transducer(s) or transmitted by a tag's transducer(s). Power/signal transformers 505 and 506 allow a tag to condition data signal levels prior to transmission, and as the data is received. Piezoelectric transducers 505 and 507 receive and transmit data and polling requests. LNA 503 can also be used to amplify incoming data in addition to any amplification gained via transformers 505 and 507. Note that the front portion of the LNA, with the Switch set in receive mode, is the only block that remains powered up at all times.

Figure 6:
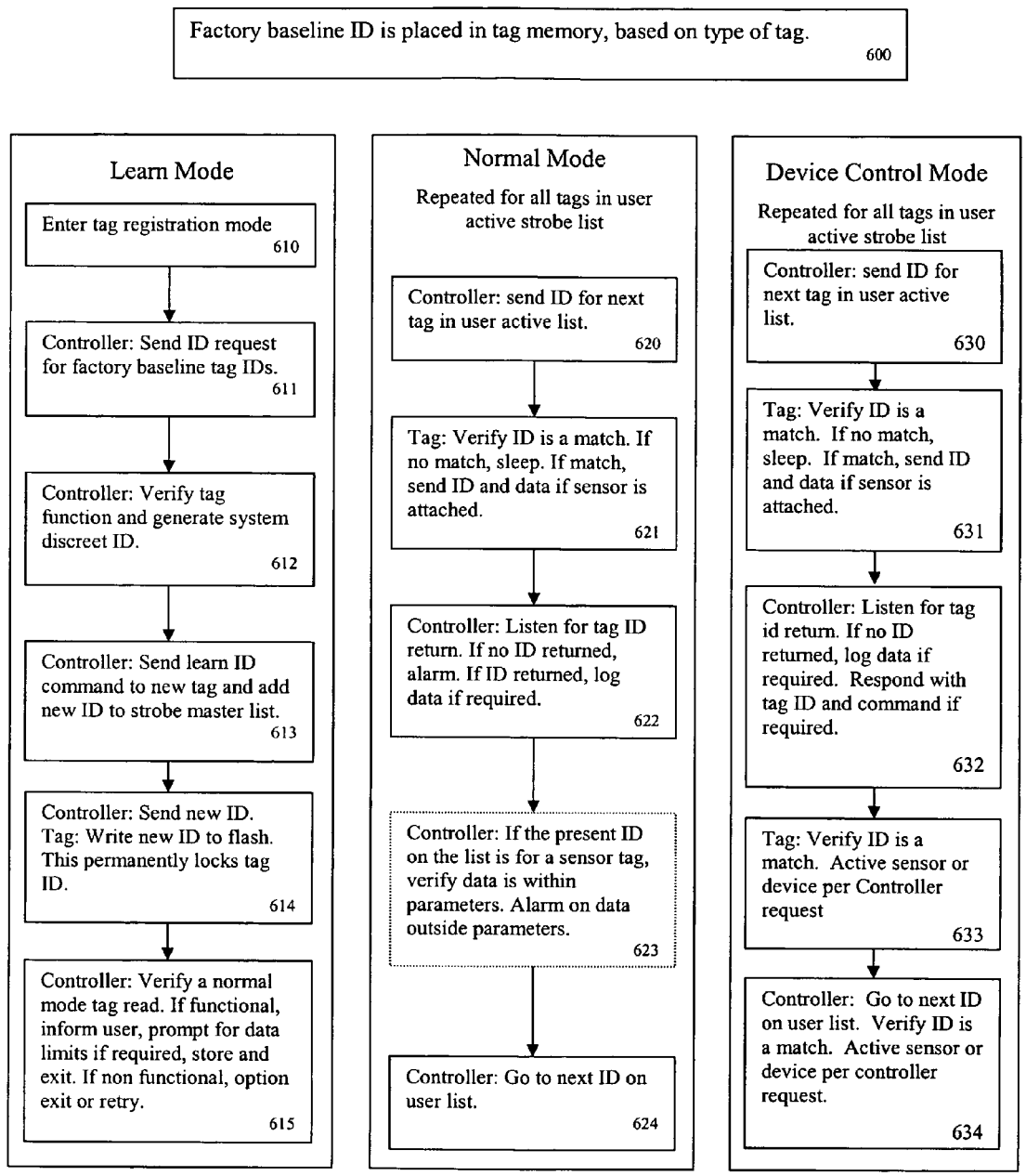
FIG. 6 is a flow chart illustrating a preferred tag learning and polling method.

FIG. 6 is a flow chart illustrating a preferred tag learning, polling, and control methods. As Block 600 of FIG. 6 illustrates, each ultrasound wireless tag preferably is assigned a baseline identifier during the manufacture process, where the baseline identifier is selected from a set of one or more previously known identifiers. In addition to explicitly identifying a tag, a tag identifier can also imply a tag structure or functionality. By way of example, without intending to limit the present invention, identifiers assigned to tags for asset monitoring may contain a prefix or use a checksum that indicates such a purpose, while tags for in situ monitoring may contain different prefixes.

When a new tag is shipped to a user, the new tag is associated with a watch, PDA, or other controlling device, or controller, through the learn mode illustrated by Blocks 610 through 615 of FIG. 6. As Block 610 indicates, a controller with which a new tag is to be associated is first placed in tag registration, or learning, mode. In a preferred embodiment, a controller next sends identification requests to all known baseline tag identifiers, as shown in Block 611. In an alternative embodiment, the baseline identifier associated with a particular new tag may be printed on the tag, printed on a container in which the tag is shipped, or otherwise accessible to a controller operator, and the controller operator can enter the tag identifier associated with the new tag directly into the controller. As a controller sends tag identification requests, the controller can monitor and log those tag identifiers which respond to the identification requests.

When a controller has learned the tag identifiers associated with any new tags, the controller can use the identifier to determine the tag type. In a preferred embodiment, the controller may act as a controller operator to verify the determined tag type as a security precaution. When a tag type has been determined for the new tag, a discreet identifier can be generated by a controller which is to be associated with the tag. In a preferred embodiment, such a discrete identifier is an identifier which is unique to a controller. By way of example, without intending to limit the present invention, each controller designed in accordance with the present invention may have a unique identifier associated therewith, and that identifier, or a portion thereof, may be used as a portion of unique tag identifiers assigned by the controller. In addition, the controller may add additional information, such as a multi-character, sequentially generated character string to the controller's identifier in creating each new tag identifier. This can result in a tag identifier that is not only unique to each controller, but also unique to all tags. This process is illustrated by Block 612 of FIG. 6.

Once a system discrete identifier has been created, a controller can send a Learn_ID command to a specific new tag. A Learn_ID command allows a new tag to record a system discrete identifier in memory stored within the tag. As Block 614 illustrates, the present invention preferably uses write-once flash memory to store system discrete identifiers within tags. In an alternative embodiment, a tag may store both a system discrete identifier and a controller identifier, or an encrypted form of a controller identifier, in write-once flash memory. Storing such data in write-once memory adds additional security, as a tag cannot be reprogrammed with an alternative identifier. In still another embodiment, controller identifier information may be stored in rewriteable memory, thereby allowing a controller to periodically change the controller identifier stored on the tag, potentially improving tag security.

As Block 615 illustrates, a final learn mode step involves verifying that the new tag responds to controller commands based on the system discrete identifier now associated with the tag. If a tag responds properly, a controller preferably asks a controller operator to input any preferences, such as alarm limits or alarm conditions, to be associated with the tag. Such preferences are preferably stored, along with the system discrete identifier associated therewith, in a controller. If a tag does not respond properly, a controller operator is given the option to retry or to exit learn mode.

In a preferred embodiment, Blocks 612 through 615 are repeated for each new tag identified in Block 611. In an alternative embodiment, Blocks 610 through 615 may be repeated in their entirety each time a new tag is to be associated with a controller.

A preferred tag polling method is illustrated by blocks 620 through 624 of FIG. 6. As Block 620 illustrates, tag polling begins with a controller sending a tag transmit request to a particular tag. As Block 631 illustrates, and as discussed above, tag transmit requests preferably include the system discrete identifier associated with a given tag, as well as a controller identifier. Tags receiving a tag transmit request first compare the system discrete identifier contained in the tag transmit request to the system discrete identifier stored in tag memory. If the system discrete identifiers do not match, then the tag stays "asleep", such that no other action is taken. If the system discrete identifiers match, then the tag may continue processing. In a preferred embodiment, tag processing continues with the tag comparing a controller identifier used in the tag transmit request with a controller identifier stored in tag memory. If the controller identifiers do not match, then the tag may stay asleep. By comparing controller identifiers and system discrete identifiers, tag security can be further enhanced. However, an alternative embodiment of the present invention does use controller identifiers, relying only on system discrete tag identifiers to determine when a tag should broadcast.

Once a tag has determined that it should reply to a tag transmit request, a tag can reply to such a request by sending its system discrete identifier. If a tag has a sensor, such as, but not limited to, a strain gauge, vibration sensor, glucose monitor, or the like attached thereto, the tag may transmit sensor data in addition to its system discrete identifier.

As Block 622 illustrates, a controller sending a tag transmit request will wait a predetermined period of time for a tag to respond. If the tag responds, a controller can take appropriate action based on any data returned by a tag, including logging such data for later use. If the tag does not respond, a controller can sound an alarm take other action as appropriate. In addition, as illustrated in Block 623, if a tag has a sensor attached thereto, the controller can verify that sensor readings are within controller operator specified limits. If sensor readings are outside such limits, an alarm may be sounded or other action taken by a controller.

As Block 624 illustrates, the normal mode process is then repeated for the next system discreet identifier associated with a controller. In addition, Blocks 620 through 624 are preferably continuously repeated to allow active monitoring of all tags. In an alternative embodiment, a controller may pause at the end of the list of system discreet identifiers associated with a controller. In another alternative embodiment, a controller may pause at the end of each normal mode process to allow multiple controllers to operate in the same region without the possibility of cross-talk or other interference where the multiple controllers, and the tags associated therewith, are operating at substantially the same frequency.

As Blocks 630 through 634 illustrate, an ultrasonic tag system according to the present invention can also control and/or activate devices that are on or associated with a tag, such as, but not limited to, implantable drug delivery systems and control systems for aircraft or for automobiles. As Block 630 illustrates, tag polling begins with a controller sending a tag transmit request to a particular tag. As Block 631 illustrates, and as discussed above, tag transmit requests preferably include the system discrete identifier associated with a given tag, as well as a controller identifier. Tags receiving a tag transmit request first compare the system discrete identifier contained in the tag transmit request to the system discrete identifier stored in tag memory. If the system discrete identifiers do not match, then the tag stays "asleep", such that no other action is taken. If the system discrete identifiers match, then the tag may continue processing. In a preferred embodiment, tag processing continues with the tag comparing a controller identifier used in the tag transmit request with a controller identifier stored in tag memory. If the controller identifiers do not match, then the tag may stay asleep. By comparing controller identifiers and system discrete identifiers, tag security can be further enhanced. However, an alternative embodiment of the present invention does use controller identifiers, relying only on system discrete tag identifiers to determine when a tag should broadcast.

Once a tag has determined that it should reply to a tag transmit request, a tag can reply to such a request by sending its system discrete identifier. If a tag has a sensor, such as, but not limited to, a strain gauge, vibration sensor, glucose monitor, or the like attached thereto, the tag may transmit sensor data in addition to its system discreet identifier.

As Block 632 illustrates, a controller sending a tag transmit request will wait a predetermined period of time for a tag to respond. If the tag does not respond, a controller can sound an alarm take other action as appropriate. If the tag responds, a controller can take appropriate action based on any data returned by a tag, including logging such data for later use. In addition, upon receiving a tag response, and preferably after processing any data returned by a tag, a controller can command a tag to send a command to a device on or associated with the tag. By way of example, without intending to limit the present invention, a tag may respond with a blood glucose measurement, and a controller can determine whether the glucose levels are within acceptable ranges. If the glucose level is outside an acceptable range, a controller may command a tag to have an implanted insulin injection device associated with the tag release an appropriate amount of insulin.

As illustrated in Block 623, a tag receiving a command first verifies that the tag is being properly addressed. A tag may determine whether it is being properly addressed using a process similar to that used for tag transmit requests. If a tag determines it is not being properly addressed, the tag may sleep. If a tag determines it is being properly addressed, the tag may execute the controller command.

As Block 634 illustrates, the control mode process is then repeated for the next system discreet identifier associated with a controller. In addition, Blocks 630 through 634 are preferably continuously repeated to allow active monitoring and control of all tags. In an alternative embodiment, a controller may pause at the end the list of system discreet identifiers associated with a controller. In another alternative embodiment, a controller may pause at the end of each normal mode process to allow multiple controllers to operate in the same region without the possibility of cross-talk or other interference where the multiple controllers, and the tags associated therewith, are operating at substantially the same frequency.

Figure 7:
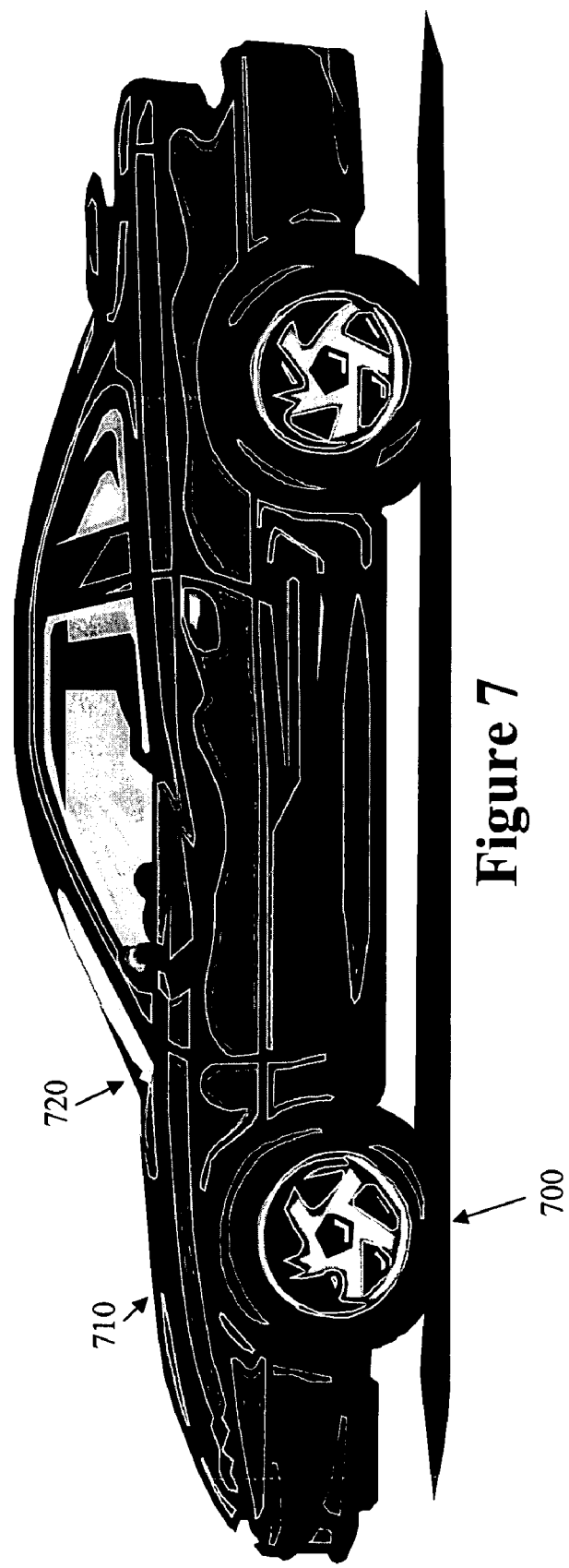
FIG. 7 illustrates the use of ultrasonic tags in an automobile.

FIG. 7 illustrates the use of ultrasound wireless tags in an automobile. In this embodiment, tag signals are received by a computer or other signal receiving and processing device (signal receiver 720) which can be built into or attached to a vehicle. It is presently preferred that signal receiver 720 interoperate with a watch or PDA, although it should be apparent to one skilled in the art that independent operation could be achieved without departing from the spirit or the scope of the invention.

It is presently preferred that the signal receiver 720 use the components and frame of the vehicle as the medium from which to read the signals from the ultrasound wireless tags. In an alternative embodiment, rather than transmitting signals through the air, the wireless tags can use the components and skin of most vehicles to carry the signals to signal receiver 720, regardless of the material from which they are made, as, unlike the radio frequencies used in conventional tags, ultrasound will propagate through any solid or liquid.

Figure 8:
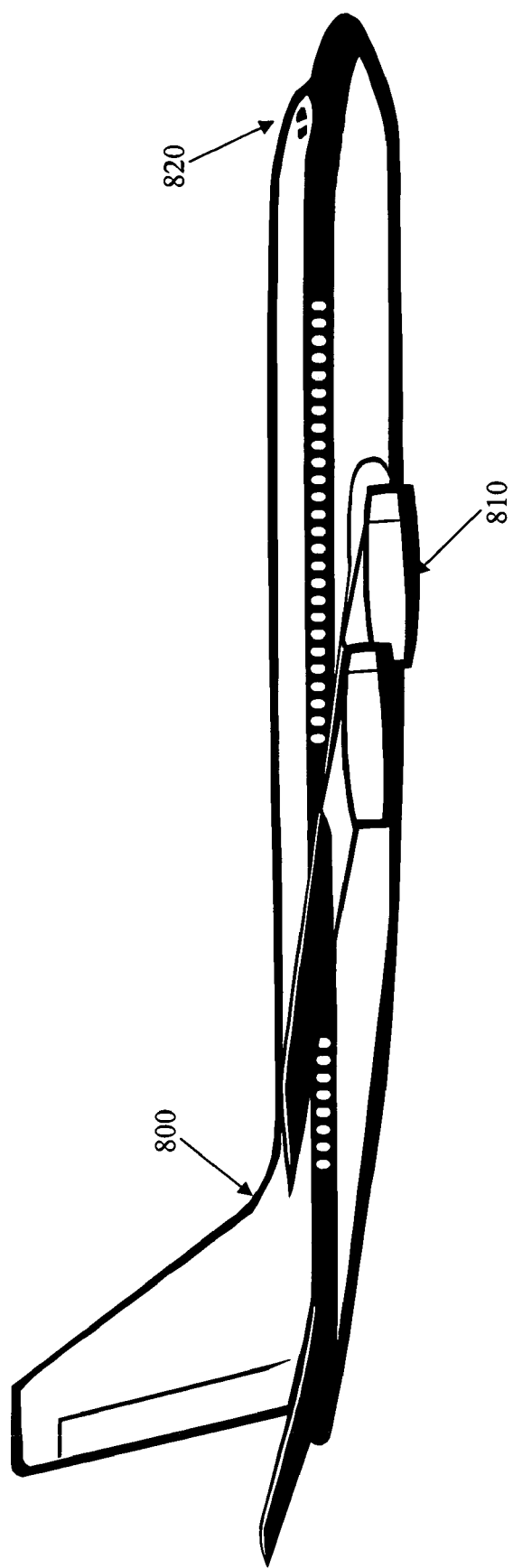
FIG. 8 illustrates the use of ultrasonic tags in an airplane.

FIG. 8 illustrates the use of ultrasonic tags in an airplane. This embodiment functions similarly to the embodiment of FIG. 7, however ultrasound wireless tags provide additional advantages to structures like airplanes. Because of their size and the safety issues involved in airplanes, it is generally desirable to limit the amount of work done on certain sections of the airplane, such as the joint between the tail and the fuselage. It is also desirable to make those sections as strong as possible. Ultrasound wireless tags can be embedded within an airplane tail, a composite or metal structural member of the tail, fuel tank, or other section during manufacture, thus permitting real time, point of interest stress monitoring, checking for material defects such as cracks, performing tag to tag ultrasound network analysis for structural integrity, and for other such purposes. Ultrasound tags can also be used to improve the safety of fuel gages inside of fuel tanks by eliminating the need to connect electrical wires, which may short out or spark and cause a fire, to the fuel tank.

Embedded ultrasound wireless tags employed in a manner such as that illustrated in FIG. 8 can eliminate the need for, or at least reduce the time between, detailed airplane component review which requires airplane disassembly. Ultrasound wireless tags also alleviate the need to reduce the structural integrity of an airplane section to allow wire to be routed through that section. Further, reducing the amount of wiring necessary within an airplane also reduces aircraft mass, electrical complexity, and maintenance time in troubleshooting and repair of wire defects/damage. In addition, wireless tags can be utilized to monitor vibrations, and low frequency sounds that could provide diagnostics to aircraft performance such as foreign material discrimination in engines that might result from birds, ice, or sand.

As with the automobile embodiment of FIG. 7, an airplane embodiment can take advantage of the components, skin, and frame of an airplane, regardless of material, to facilitate communications between signal receiver 820 and wireless tags 800 and 810. In addition, due to the use of physical waves rather than the use of electrical radiation in ultrasonic communication systems of the present invention, there is little or no risk of impeding or interfering with vital airplane radio communication or navigation. Further, when used to monitor a fuel tank or other volatile container, the present invention increases safety over prior art, wired sensors due to elimination of wiring and electricity around fuel, fuel vapors, and the like.

Wireless tags, and particularly ultrasonic tags, can be used in virtually any vehicle, including automobiles, aircraft, boats, rescue and safety equipment, recreational vehicles, and the like for a variety of sensing purposes. Almost every sensor type required on today's vehicles can be integrated using ultrasound communications. By way of example, without intending to limit the present invention, wireless sensors can be used in the automobile embodiment of FIG. 7 to actively monitor tire pressure 700, engine temperature 710, and break pad wear and report the results to a signal receiver 720. In addition, a sensor or sensors can be attached to engine or transmission components to detect excessive vibration, temperature, pressure or stresses during testing or during operation. Similarly, in the airplane embodiment of FIG. 8, wireless sensors can be used to measure shear stress at tail rudder 800 and wing-fuselage joint stress 810 and report this back to signal receiver 820. Wireless tags are particularly well suited for tight locations, in which wire routing is difficult or impossible, and for moving parts. By way of example, without intending to limit the present invention, wireless tags are especially well suited for tire pressure monitoring because wireless tags do not require electrical connectivity with a reader or other sensor processing device. Thus, a sensor can be implanted in a tire or rim without requiring elaborate electrical connectivity systems.

Ultrasonic sensors can also be utilized for access control by conducting digital code ultrasonically from the watch to the automobile through the keys or through the console and the code matched with an access control sensor allowing starting of the vehicle or allowing the vehicle to be moved from Park to Drive in applications such as law enforcement or in high-end security systems for automobiles where only the designated driver can operate the vehicle and not a thief or assailant.

Figure 9:
FIG. 9 illustrates the use of ultrasonic tags in vital sign monitoring.

FIG. 9 illustrates the use of ultrasonic tags in vital sign and other biometric monitoring. Because of the extremely low power requirements and the small physical size of the transducer of the ultrasonic tag portion of the present invention, the wireless tags can be readily adapted for use in the human body. In addition, drug delivery systems can be controlled by wireless in-vivo sensors and bioprobes. In the embodiment illustrated in FIG. 9, a wireless tag 900 is mated with a glucose sensor and embedded in a diabetic user's skin at or near the wrist. Watch 910 periodically polls wireless tag 900 to determine whether the user should be alerted that his or her blood sugar levels have changed, potentially requiring an insulin injection.

In one embodiment, wireless tag 900 may contain a rechargeable power source, such as a battery, which is inductively or capacitively charged by watch 910. In an alternative embodiment, wireless tag 900 may contain a small inductive transformer in lieu of a battery, and any power required by tag 900 can be directly supplied by watch 910. In this alternative embodiment, it is preferred that watch 910 include a secondary battery, preferably a rechargeable battery, from which wireless tag 900 is powered. Watch 910 can enable power to tag 900 shortly before requesting data from tag 900. By providing power to tag 900 without requiring a battery to be implanted therewith, this embodiment is able to place more intelligent sensors in the body without necessitating the insertion of toxic chemicals, such as lead, zinc, or lithium which are typically required in batteries.

Figure 10:
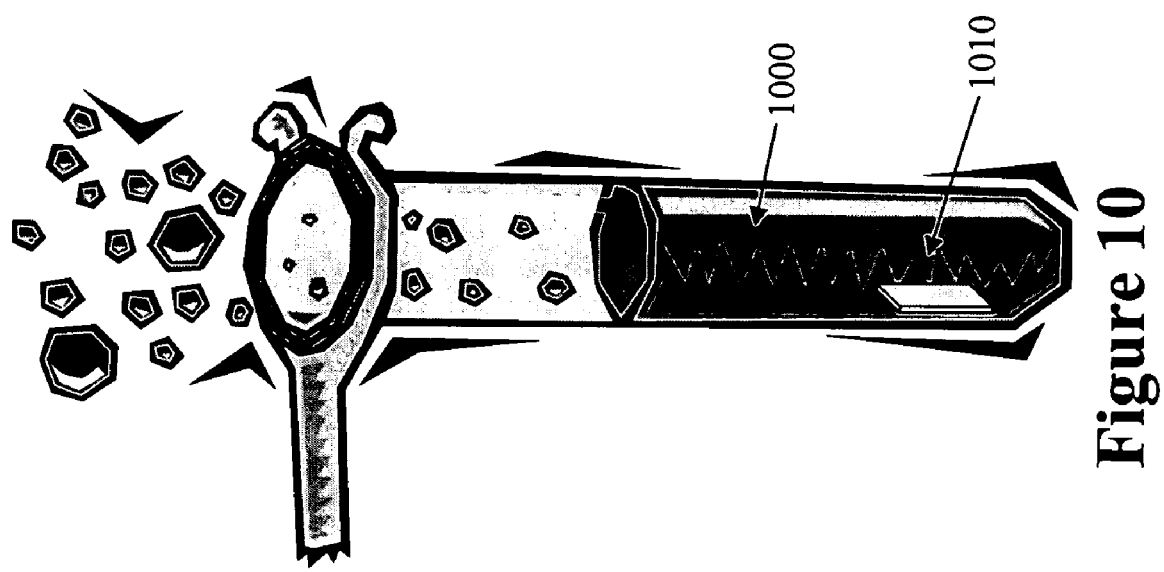
FIG. 10 illustrates the use of an ultrasonic tag as a disposable chemical or biological agent tester.

FIG. 10 illustrates the use of an ultrasonic tag as a disposable chemical or biological agent tester either in situ, transdermally, or on the skin. The small size, light weight, and inexpensive production costs associated with wireless tags of the present invention make them conducive for use as in environments where it is advantageous to dispose of, rather than reuse, a test kit, such as in field tests for various biological or chemical agents. Ultrasonic tags with MEM sensors can even be used as "smart Band-Aids" for applications such as "hygiene strips" which sense that hands have been washed and are clean for a specified length of time in critical applications such as hospital wards and surgery areas, and also alerting that the hands need to be washed after a specified length of time. MEMs can include a wide variety of biochips, including biochips that pick up harmful bacteria and relay the presence back to a reader. As used in the embodiment illustrated in FIG. 10, wireless tag 1010 allows tests to be performed without introducing additional chemicals or biological agents into sample 1000, and without possibly contaminating a surrounding area by requiring physical connectivity between sample 1000 and a test device (not pictured). A test device, such as, but not limited to, a watch or PDA, simply polls wireless tag 1010 for the test results and, where appropriate, wireless tag 1010 is discarded or destroyed along with sample 1000.

Figure 11:
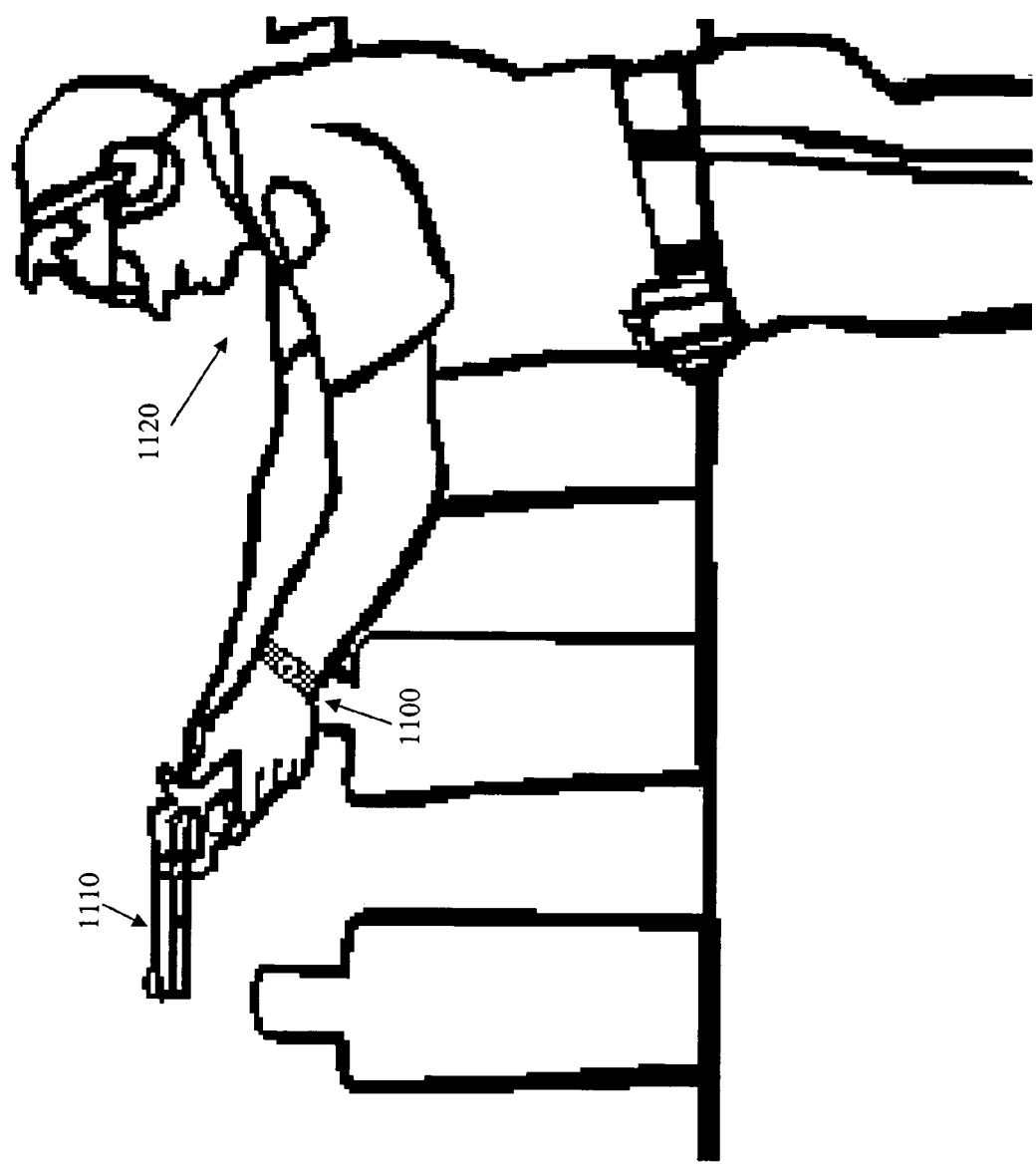
FIG. 11 illustrates the use of an ultrasonic tag for security.

FIG. 11 illustrates the use of an ultrasonic tag for security or access control. In this embodiment, police officer 1120 is able to operate handgun 1110 because he is wearing watch 1100. In this embodiment, watch 1100 contains a transducer which is able to communicate with a transducer mounted inside handgun 1110. It is presently preferred that such communication occur through police officer 1120 (i.e. through his skin), directly to handgun 1110, rather than through the air. This arrangement still allows police officer 1120 to fire handgun 1110 with either hand, while preventing handgun 1110 from receiving a confirmation signal from watch 1100 through the air. Ultimately, this prevents a perpetrator from intentionally stealing handgun 1110 from police officer 1120 and using handgun 1110 against police officer 1120. To effectively fire handgun 1110, a perpetrator would have to also steal watch 1100, or maintain skin to skin physical contact with police officer 1120.

In a preferred embodiment, a wristwatch may include two additional security features which make it even more difficult for a perpetrator to use a weapon against a police officer or other watch owner. First, a wristwatch can require a personal identification code, such as PIN codes used on ATM machines, to active the security functions of the wristwatch. Second, a wristwatch can include an additional cutoff system that senses environmental changes, such as, but not limited to, changes in temperature, heart rate of the wearer, and the like, which are indicative of a watch having been removed from its wearer. Thus, when a watch is removed, the security related functions associated therewith are disabled and, unless the next person to put on the watch knows the appropriate personal identification code, they will not be able to take advantage of the security features associated with the watch.

In addition to its obvious law enforcement and military uses, the firearm security system described in this embodiment can prevent tragic accidents caused by children finding and playing with firearms in a household because only authorized adults will have knowledge of the personal identification code, and removal of the watch causes the firearm to cease working. Access control can be extended to applications such as door, vault, or vehicle access in a similar manner.

In an alternative embodiment of the security system of FIG. 11, an implant such as that taught above with respect to FIG. 9 may be used. In this embodiment, the implant may have a unique identifier, to which handgun 1110 is keyed. Watch 1100 may read an identifier from an implant and transmit the identifier to handgun 1110. If the transmitted identifier matches the keyed identifier, only then handgun 1110 will be operable. This embodiment further limits a perpetrator's ability to operate handgun 1110, because the perpetrator could steal handgun 1110 and watch 1100 and still not be able to fire handgun 1110. In an alternative embodiment, a biometric sensor such as an infrared scanner can be placed underneath the watch to uniquely identify the persons absorption and transmission spectrum and watch 1100 may read the identifier from the biometric sensor. It should be obvious to one skilled in the art that although the description of this embodiment focuses on handgun safety, such a system can also be used in other cases where it is desirable to have more active user identification, such as automobile ignition systems, computer or physical security, and the like.

Figure 12:
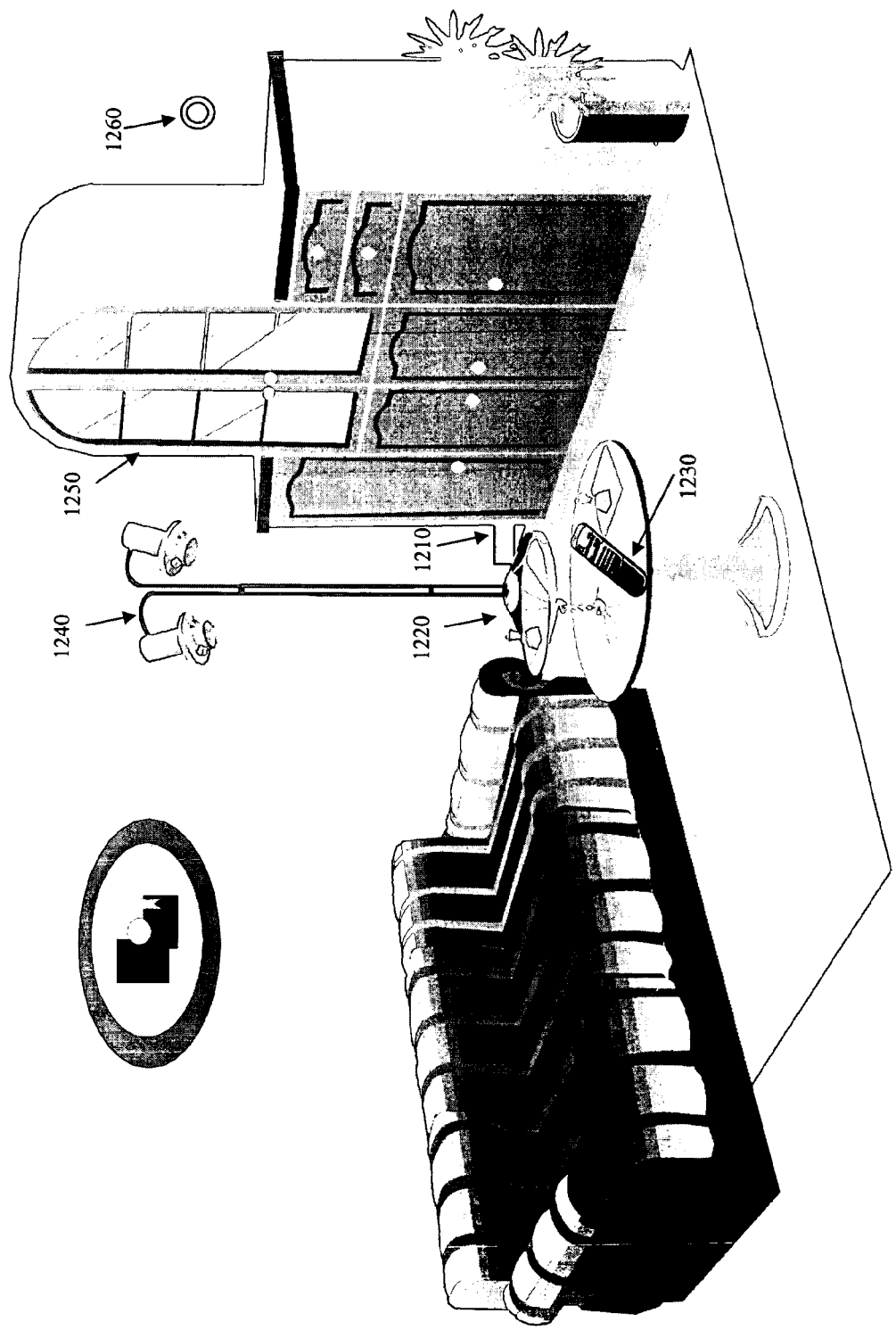
FIG. 12 illustrates the use of ultrasonic tags for home automation.

FIG. 12 illustrates the use of wireless ultrasound tags for home automation. In this embodiment, a transducer 1210 is placed on the structure of a house with an ultrasonic reader and control unit. Ultrasound wireless tags 1220 can be placed throughout the household on and in devices and structures throughout the house, such as lamp 1240, home entertainment center 1250, and thermostat 1260. Each wireless tag can be independently controlled through one or more control units 1210 or one or more wireless transceivers 1230. In this embodiment, the structure of the house itself is utilized as the communication network, much as the frame of the airplane was used to facilitate communication in the embodiment illustrated in FIG. 8.

Figure 13:
FIG. 13 illustrates the use of an ultrasonic system as an electronic leash for individuals or for pets.

FIG. 13 illustrates the use of an ultrasonic system as an electronic leash for individuals or for pets. In this embodiment, a wireless transducer is placed on an individual such as a child or a person with tendencies to wander such as an Alzheimer's patient, and the transducer triggers an alarm in the watch or the reader if the individual wanders too far away from the watch/reader. Similarly, a collar is placed on a pet with a wireless transducer and either an alarm or a pet-audible ultrasonic alarm goes off if the pet wanders too far away from the watch/reader preventing runaway pets and allowing for improved training of the pet.

Figure 14:
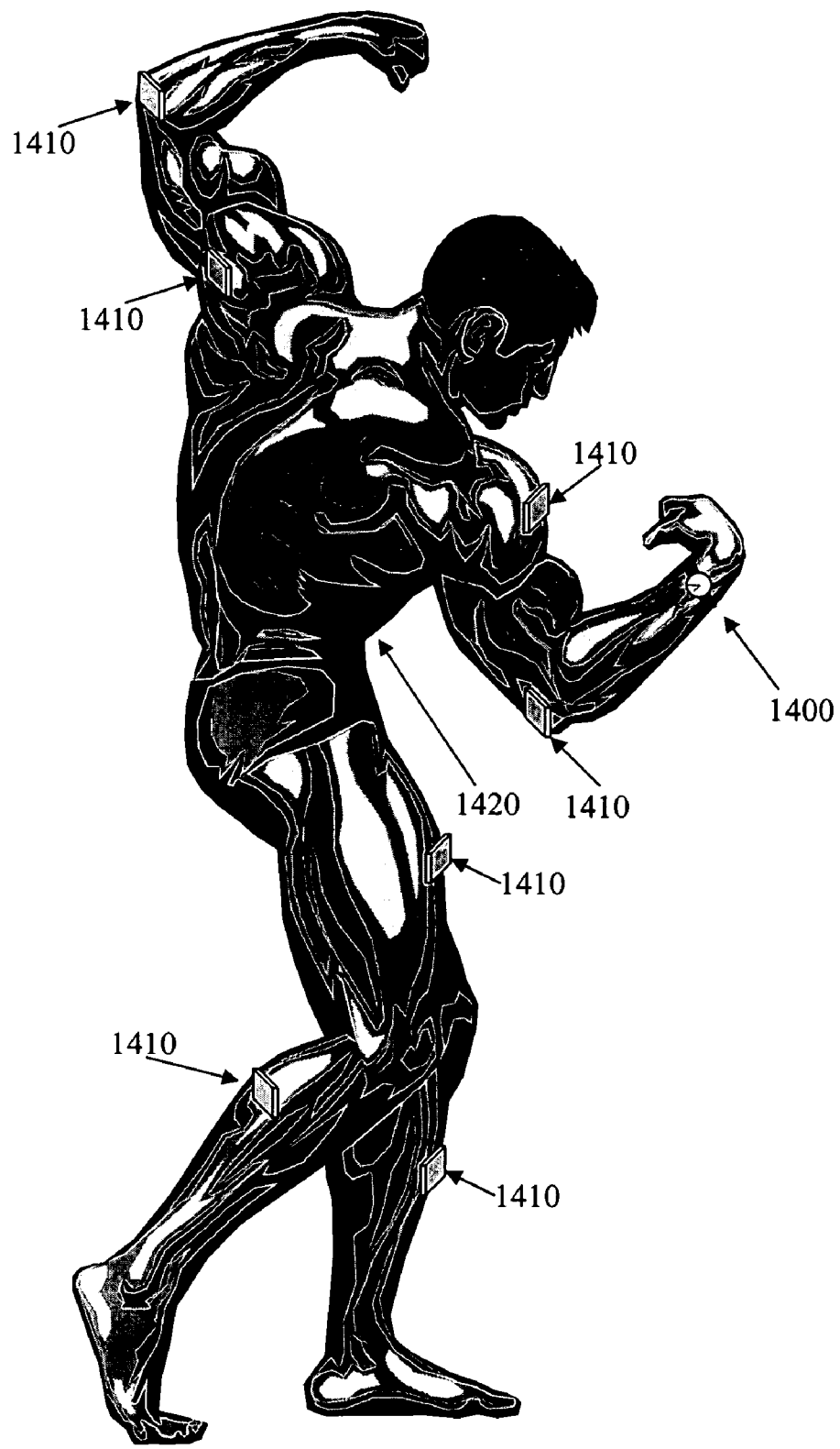
FIG. 14 illustrates the use of an ultrasonic system for kinesiology.

FIG. 14 illustrates the use of an ultrasonic system for kinesiology. In this embodiment, wireless transducers are placed on the surface of the body or in clothing which is in proximity to the body to monitor kinesilogoical movements for sports, health, medicine and animation activities where data from the sensor network 1410 is fed back to a data acquisition wristwatch 1400. This data can later be downloaded to a larger computer for analysis of motion, muscle activity, temperature, stress, and other sensor data.

FIG. 14 also illustrates the use of an ultrasonic system for embedded identification of individuals who are prone to leave a preferred boundary, such as the confines of a building. Examples of such individuals include, but are not limited to, persons with Alzheimer's and children. In this embodiment, an ultrasonic transducer is placed in a suitable capsule and implanted inside a patient's body 1420. The ultrasonic transducer can transmit a signal which allows responsible parties to track of patient's location through the use of tag readers which have been employed throughout the premises, such as within a building and on grounds associated therewith. In a manner similar to the proximity detection system of FIG. 2, this embodiment can detect when a patient is no longer on the premises and sound an alarm, thus allowing faster recovery of the patient.

Figure 15:
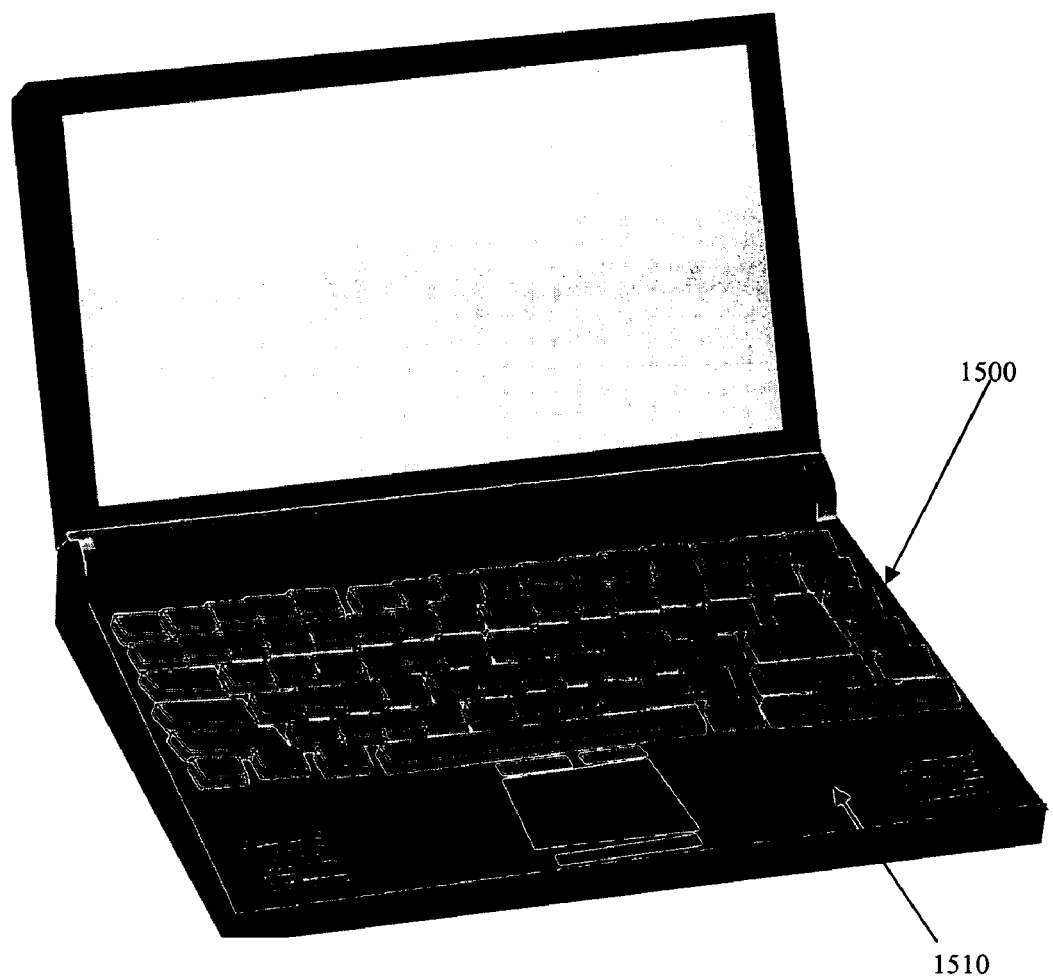
FIG. 15 illustrates the use of a self-alarming ultrasonic tag in a valuable device.

FIG. 15 illustrates the use of an ultrasonic tag 1500 in a valuable device 1510. In this embodiment, ultrasonic tag 1500 is equipped with an alarm that sounds if the tag is not polled by an associated ultrasonic reader within a certain amount of time. Such an alarm can provide early security alerts to an unguarded valuable such as a laptop.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

We claim as our invention:

1. An ultrasound transducer, comprising at least one thin film having longitudinal, latitudinal, and z axes, wherein the at least one thin film is prestressed along the longitudinal axis by bending the at least one thin film around a given radius.

2. The ultrasound transducer of claim 1, comprising two thin films wherein the bend radii of each thin film allows for distinct z axis separation between the films.

3. The ultrasound transducer of claim 1, wherein the at least one thin film is a Polyvinylidene fluoride film.

4. The ultrasound transducer of claim 2, wherein the two thin films are Polyvinylidene fluoride films.

5. The ultrasound transducer of claim 4, wherein the two thin films have a nominal radius of 37.5 millimeters, an arc length of approximately 18.75 millimeters, and a width of approximately 9.375 millimeters.

6. The ultrasound transducer of claim 4, wherein the two thin films are stressed in such a manner as to achieve optimal frequency response at 60 KHz.

7. An asset monitoring method comprising:
 registering at least one ultrasonic tag with at least one ultrasonic wireless controller;
 affixing the at least one ultrasonic tag to an asset;
 polling the at least one ultrasonic tag periodically by at least one controller; monitoring ultrasonic tag replies to the periodic polling; and,
 sounding an alarm if the at least one ultrasonic tag does not reply.

8. The asset monitoring method of claim 7, wherein the at least one ultrasonic tag is embedded in the asset.

9. The asset monitoring method of claim 7, wherein the at least one ultrasonic tag is comprised of a plurality of tags.

10. The asset monitoring method of claim 9, wherein each ultrasonic tag in the plurality of ultrasonic tags is polled sequentially.

11. The asset monitoring method of claim 7, wherein the alarm is sounded only when the at least one ultrasonic tag does not reply when polled at least two successive times.

12. An asset monitoring method comprising:
 registering at least one ultrasonic tag with at least one ultrasonic wireless controller;
 affixing the at least one ultrasonic tag to an asset;

polling the at least one ultrasonic tag periodically by at least one controller; monitoring ultrasonic tag replies to the periodic polling; and, sounding an alarm if the at least one ultrasonic tag replies after a period of not replying.

13. The asset monitoring method of claim 12, wherein the at least one ultrasonic tag is embedded in the asset.

14. The asset monitoring method of claim 12, wherein the at least one ultrasonic tag is comprised of a plurality of tags.

15. The asset monitoring method of claim 14, wherein each ultrasonic tag in the plurality of ultrasonic tags is polled sequentially.

16. An asset monitoring method comprising:

registering at least one ultrasonic tag with at least one ultrasonic wireless controller; affixing the at least one ultrasonic tag to an asset;

polling the at least one ultrasonic tag periodically by at least one controller; monitoring ultrasonic tag replies to the periodic polling;

sounding an alarm if the at least one ultrasonic tag does not reply; and sounding an alarm if the at least one ultrasonic tag replies after a period of not replying.

* * * * *